US009287070B2

(12) United States Patent
Lescale

(10) Patent No.: US 9,287,070 B2
(45) Date of Patent: *Mar. 15, 2016

(54) HIGH VOLTAGE DIRECT CURRENT CIRCUIT BREAKER ARRANGEMENT AND METHOD

(71) Applicant: ABB TECHNOLOGY AG, Zurich (CH)

(72) Inventor: Victor Lescale, Ludvika (SE)

(73) Assignee: ABB TECHNOLOGY AG, Zürich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,975

(22) Filed: Jul. 3, 2013

(65) Prior Publication Data

US 2013/0293985 A1 Nov. 7, 2013

Related U.S. Application Data

(62) Division of application No. 13/130,834, filed as application No. PCT/EP2008/066243 on Nov. 26, 2008, now Pat. No. 8,797,695.

(51) Int. Cl.

| | |
|---|---|
| ***H02H 7/00*** | (2006.01) |
| ***H01H 33/02*** | (2006.01) |
| ***H01H 33/59*** | (2006.01) |
| *H01H 33/14* | (2006.01) |

(52) U.S. Cl.

CPC ............. *H01H 33/02* (2013.01); *H01H 33/596* (2013.01); *H01H 33/14* (2013.01)

(58) Field of Classification Search

CPC ...... H01H 33/596; H01H 33/02; H01H 33/14

USPC ................................................ 361/8; 335/11

See application file for complete search history.

(56) References Cited

U.S. PATENT DOCUMENTS

| | | | |
|---|---|---|---|
| 3,678,338 | A | 7/1972 | Beachley |
| 4,305,107 | A | 12/1981 | Murano et al. |
| 4,922,124 | A | 5/1990 | Seki et al. |

(Continued)

FOREIGN PATENT DOCUMENTS

| | | | |
|---|---|---|---|
| EP | 0 758 137 | A1 | 2/1997 |
| FR | 1.199.633 | | 12/1959 |

(Continued)

OTHER PUBLICATIONS

English translation of Kanda (JP 57-59217).*

(Continued)

*Primary Examiner* — Stephen W Jackson
*Assistant Examiner* — Ann Hoang
(74) *Attorney, Agent, or Firm* — Birch, Stewart, Kolasch & Birch, LLP

(57) ABSTRACT

A DC circuit breaker arrangement for interrupting a direct current on a line, includes: n DC circuit breakers connected in parallel, where n>2, which parallel connection of DC circuit breakers is connected in series with the line, the direct current of the line being divided between the n DC circuit breakers, and n reactors, each reactor being connected to one of the DC circuit breakers, for preserving the current division during current interruption. A method for interrupting or commutating a direct current on a transmission line or in a HVDC circuit is also provided.

9 Claims, 2 Drawing Sheets

(56) References Cited

U.S. PATENT DOCUMENTS

| | | | | |
|---|---|---|---|---|
| 5,666,277 | A | 9/1997 | Bjorklund et al. | |
| 7,098,638 | B1 * | 8/2006 | Herbert | 323/282 |
| 2006/0028187 | A1 | 2/2006 | Kim | |

FOREIGN PATENT DOCUMENTS

| | | | |
|---|---|---|---|
| FR | 2.166.440 | | 8/1973 |
| JP | 56-158034 | | 11/1981 |
| JP | 57059217 A | * | 4/1982 |

OTHER PUBLICATIONS

Nakao et al., "D.C. Current Interruption in HVDC SF6 Gas MRTB by Means of Self-Excited Oscillation Superimposition", IEEE Transactions on Power Delivery, New York, NY, US, vol. 16, No. 4, Oct. 1, 2001, pp. 687-693.

* cited by examiner

HIGH VOLTAGE DIRECT CURRENT CIRCUIT BREAKER ARRANGEMENT AND METHOD

This application is a Divisional of Non-Provisional application Ser. No. 13/130,834 filed on Oct. 3, 2011, which is a National Phase Application under 37 U.S.C. §371 of PCT International Application No. PCT/EP2008/066243 filed on Nov. 26, 2008. The entire contents of each of the above-identified applications are hereby incorporated by reference.

FIELD OF THE INVENTION

The invention relates generally to the field of electrical power transmission systems and in particular to means for interrupting or commutating a high voltage direct current. The invention also relates to a corresponding method.

BACKGROUND OF THE INVENTION

High voltage direct current (HVDC) power systems comprise protection and control systems arranged to protect, monitor and control the functioning of devices forming part of the power system. The protection systems prevent, among other things, short-circuits, over-currents and over-voltages in e.g. power transmission lines of the HVDC system.

Protective relays are used throughout the HVDC system for providing such protection and control. The protective relays detect and isolate faults on transmission and distribution lines by opening and closing circuit breakers. It is not always necessary to perform a complete interruption; instead a commutation to an alternative path is performed. In essence the current in part(s) of the original current path will stop flowing, but it will not be interrupted, only redirected. To achieve this, a HVDC breaker is used.

FIG. 1 illustrates schematically a basic conventional direct current (DC) circuit breaker, also called DC breaker, which is arranged along a DC line L carrying a direct current I. The DC breaker 1 is designed so as to be able to break or commutate the direct current I. To this end the DC breaker 1 comprises an alternating current circuit breaker 2, denoted interrupter in the following, connected in parallel with a resonant LC branch 3, 4, i.e. a capacitor 3 connected in series with an inductor 4. A non-linear resistor 5 is connected in parallel with the LC branch 3, 4 for limiting the capacitor voltage when the direct current I flows through the capacitor instead of through the interrupter 2. The inductor 4 may, but needs not to, be a physical component; the leakage inductance in the circuit can often be enough.

In the following, a usual interrupting process is described. Upon interrupting or breaking the direct current I, a current is carried between the contacts of the interrupter 2 through an arc, and this arc current $I_{arc}$ has to be extinguished. FIG. 2 illustrates the arc characteristics of the arc current $I_{arc}$ in the interrupter 2. For interrupter currents $I_{arc}$ up to approximately 5 kA the arc voltage/current slope is negative, which causes a growing oscillation against the LC branch 3, 4. When the oscillating current has grown enough, i.e. so as to be equal to the direct current I, the arc current $I_{arc}$ reaches a current zero crossing, whereupon the arc is extinguished and the total direct current goes through the capacitor 3. The voltage of the capacitor 3 then grows rapidly until it reaches the knee point of the non-linear resistor 5, e.g. a surge arrester, which is arranged to limit the voltage on the capacitor 3. The capacitor voltage constitutes a counter-voltage in the circuit causing the current I to decrease until it ceases.

The above-described conventional DC circuit breaker 1 functions properly for transmission line or HVDC circuit direct currents I up to approximately 4-5 kA. For higher currents, there are two main limiting factors in the interrupting process just described:

- The steady state current capability of the interrupter is today limited to approximately 5 kA.
- The arc characteristic, as shown in FIG. 2, is a curve, which beyond a certain arc current $I_{arc}$ loses its negative slope and becomes flat, which makes it difficult to have an oscillation large enough to cause a zero crossing in the arc current $I_{arc}$. The corresponding direct current I at which the characteristic becomes flat is not an exact point but is somewhere around 4 to 5 kA.

SUMMARY OF THE INVENTION

It is an object of the invention to provide an improved DC circuit breaker arrangement able to handle much higher current levels than existing DC circuit breakers.

It is another object of the invention to provide a DC circuit breaker arrangement that can be implemented using existing components.

These objects, among others, are achieved by a DC circuit breaker arrangement and by a method as defined in the independent claims.

In accordance with the invention, a DC circuit breaker arrangement for interrupting a direct current on a line is provided, where the line is to be understood as either a power transmission line or a connection line in a HVDC circuit carrying the direct current to be interrupted. The DC circuit breaker arrangement comprises at least a first and a second DC breaker arranged in parallel along the line and the current of the line is divided between the at least first and second DC breakers.

In particular, the DC circuit breaker arrangement comprises a first DC breaker, which in turn comprises a first interrupter connected to the line. The first DC breaker further comprises a first resonant LC branch and a first non-linear resistor connected in parallel with the first interrupter. The DC circuit breaker arrangement comprises further a second DC breaker, identical to the first DC breaker. The second DC breaker thus comprises a second interrupter and a second resonant LC branch and a second non-linear resistor connected in parallel with the second interrupter. The second DC breaker is connected in parallel with the first DC breaker on the line, where the parallel connection of first and second DC breaker is connected in series with the line. The direct current is divided between the first and second DC breakers. By introducing a division of the current into two or more branches, each branch carrying a part of the current, the steady state current in each interrupter is halved or lessened even more. Further, the current to be interrupted in each interrupter is also halved or lessened even more. By means of the invention, a DC circuit breaker arrangement is provided, able to handle direct currents up to 10 kA or even higher. The DC circuit breaker arrangement can be made by using conventional components that are readily available, rendering the DC circuit breaker arrangement cost-efficient and easy to manufacture. A DC circuit breaker arrangement is provided for use in applications wherein the nominal direct current or currents during overload conditions exceed the capacity of existing DC breakers.

In accordance with an embodiment of the invention, means are included for preserving the desired current division during an interruption process of the at least first and second DC breakers. A most reliable DC circuit breaker arrangement is thus provided, wherein there is no risk of the circuit breaker that interrupts its current first commutating the full current to the other circuit breaker.

In accordance with an embodiment of the invention, the means for preserving the current division during the interruption process comprises a two winding transformer connected to the first and second DC breakers. The invention can thus be implemented using conventional components, enabling a cost-efficient solution.

In accordance with another embodiment of the invention, a third DC breaker is provided connected in parallel with the first and second DC breakers on the transmission line or in the HVDC circuit. The current is thus divided between three branches and a DC circuit breaker arrangement able to handle even higher currents is thereby provided. Such circuit breaker arrangement is sufficient for all types of applications of a high voltage direct current (HVDC) network.

In accordance with still another embodiment of the invention, the means for enabling a preserved current distribution during the interruption process with three branches comprises three Z-connected (zig-zag-connected) transformers which are connected to the first, second and third DC breakers. Again, the invention can be implemented using conventional components, which enables a cost-efficient solution.

The invention is also related to a corresponding method, whereby advantages similar to the above are achieved.

Further embodiments and advantages thereof will become clear upon reading the following description.

DETAILED DESCRIPTION OF EMBODIMENTS

Figure 1:
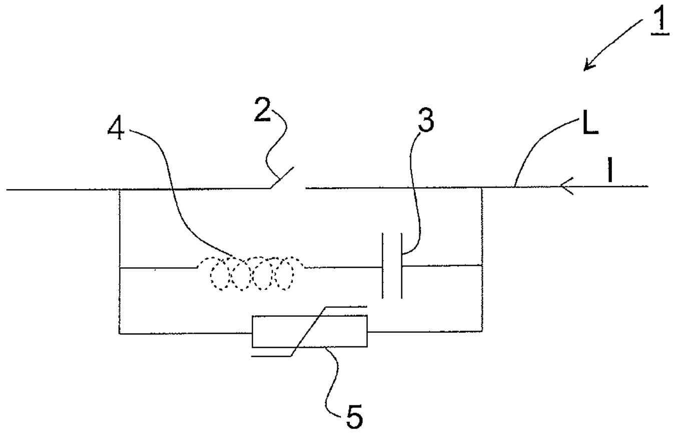
Fig. 1 (Prior Art)
FIG. 1 illustrates a basic conventional DC circuit breaker.
Figure 2:
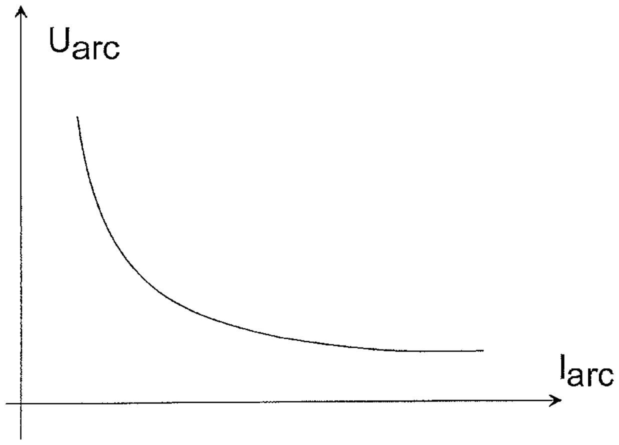
FIG. 2 illustrates arc characteristics for an alternating current circuit breaker used as interrupter in a DC circuit breaker.

FIGS. 1 and 2 have already been described and the same reference numerals are used throughout the figures for denoting same or corresponding parts.

Figure 3:
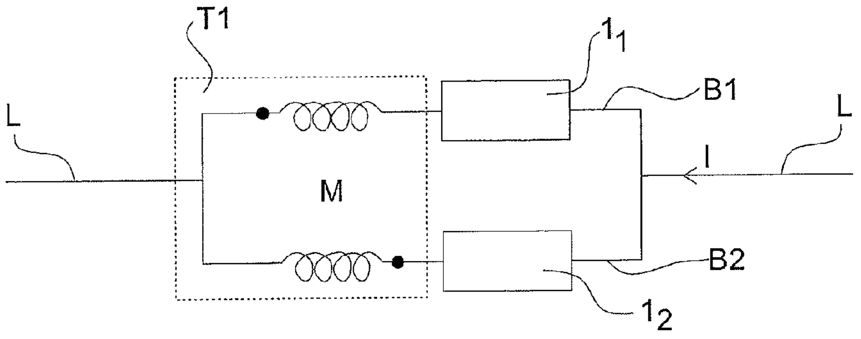
FIG. 3 illustrates a first embodiment of a DC circuit breaker arrangement in accordance with the present invention.

FIG. 3 illustrates a first embodiment of the invention. A DC circuit breaker arrangement, in the following denoted DC circuit breaker arrangement 6, in accordance with the invention, is arranged connected along, i.e. in series with, a line L carrying a do current I. The line L can be a power transmission line or a connection line in a HVDC circuit.

In accordance with the invention, the direct current I of the line L is divided into two branches B1 and B2. The two branches B1, B2 are identical, and each comprises a DC breaker $\mathbf{1}_1$, $\mathbf{1}_2$, which in turn comprises a respective first or second interrupter $\mathbf{2}_1$, $\mathbf{2}_2$ as described in connection with FIG. 1. Respective first or second LC branches $\mathbf{3}_1$, $\mathbf{4}_1$ and $\mathbf{3}_2$, $\mathbf{4}_2$ are connected in parallel with the respective first or second interrupter $\mathbf{2}_1$, $\mathbf{2}_2$. Further, first and second non-linear resistors $\mathbf{5}_1$ and $\mathbf{5}_2$ are connected in parallel with the respective first or second LC branches $\mathbf{3}_1$, $\mathbf{4}_1$; $\mathbf{3}_2$, $\mathbf{4}_2$. Each branch B1, B2 thus takes half the line current I.

To simply divide the direct current I into two paths would not solve the above-described problem of losing the negative current/voltage slope at high currents (see FIG. 2) and the entailing difficulties to effectuate a current interruption would remain. More specifically, if the direct current I were to be simply divided into the two branches B1, B2, then at the instant when one of the interrupters, either the first $\mathbf{2}_1$ or the second $\mathbf{2}_2$ interrupter, successfully breaks its current while the other is still in the process of extinguishing its arc, the full current would commutate into the other branch. The other branch would then not be able to interrupt the current. The same applies if the current were to be simply divided into more current paths.

Therefore, in order to preserve the desired current division during the interruption process, a two winding transformer T1 is used in accordance with the invention. The magnetizing impedance of the two winding transformer T1 opposes an uneven current distribution that would occur in the above-described situation, when the one of the first and the second interrupters $\mathbf{2}_1$ and $\mathbf{2}_2$ has successfully interrupted its current.

The DC circuit breaker arrangement 6 in accordance with the first embodiment of the invention thus comprises two parallel-connected conventional DC breakers $\mathbf{1}_1$ and $\mathbf{1}_2$ connected to a two winding transformer T1, i.e. to a single-phase two-winding transformer comprising primary and secondary windings, or coils, wound around a single magnetic core. In particular, one of the DC breakers $\mathbf{1}_1$ and $\mathbf{1}_2$ is connected to the polarity end of one winding of the transformer T1, and the other DC breaker is connected to the non-polarity end of the other winding of the transformer T1. The winding polarities are shown in the figure by filled-in dots, in conventional manner. During steady state operation, the currents of the windings will cancel out the magnetic flux of each other in the core. Conventional components can thus be utilized, providing a cost-efficient DC circuit breaker arrangement.

When the direct current I is to be interrupted, the DC breakers $\mathbf{1}_1$, $\mathbf{1}_2$ work in conventional manner, as described in the introductory part of the present application. One of the DC breakers $\mathbf{1}_1$, $\mathbf{1}_2$ will succeed first in the current interruption process. The one first succeeding is denoted x and its current will flow through its associated capacitor $\mathbf{3}_x$. The voltage across the DC breaker $\mathbf{1}_x$ will grow and this voltage will try to move the current in branch Bx to the other branch, which still has no counter-voltage. However, the magnetizing impedance of the transformer T1 prevents this from happening.

Figure 4:
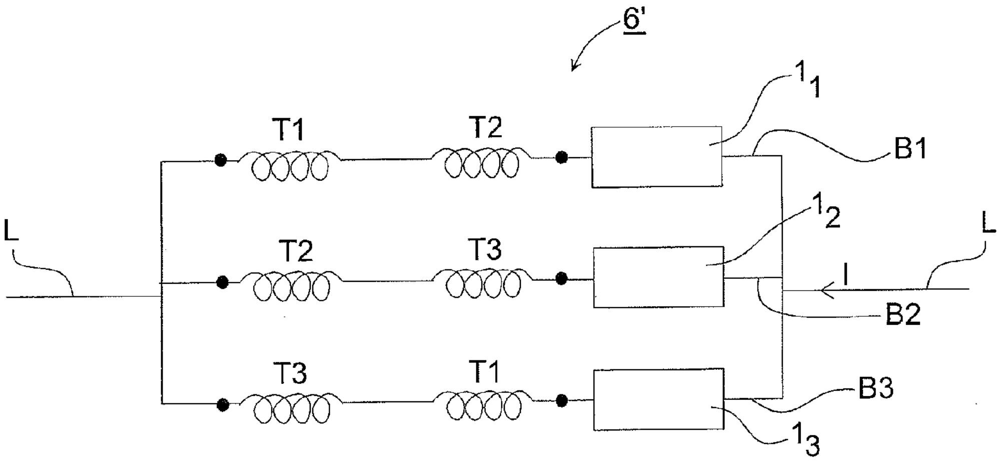
FIG. 4 illustrates a second embodiment of a DC circuit breaker arrangement in accordance with the present invention.

FIG. 4 illustrates a second embodiment of the invention. In the DC circuit breaker arrangement 6' in accordance with this embodiment, the direct current I is divided into three branches B1, B2 and B3, each branch thus carrying a third of the direct current I during steady state operation. Each branch B1, B2, B3 comprises a respective DC breaker $\mathbf{1}_1$, $\mathbf{1}_2$, $\mathbf{1}_3$ with a layout as described earlier.

In order to preserve the current distribution during the current interruption process, three conventional transformers T1, T2, T3 are provided. The transformers T1, T2, T3 are connected in a zig-zag connection with the polarities as indicated in the FIG. 4. For the particular case with three branches, this transformer connection is also known as Z-connection, and could be achieved with a three-phase Z-connected transformer.

In particular, the non-polarity terminal of one coil on each transformer is connected to the non-polarity terminal of one coil in another transformer. Alternatively, the connection can be so that the polarity terminal of one coil on each transformer is connected to the polarity terminal of one coil of another transformer. During steady state operation, with opposing currents, the first and second coil winding's magnetic flux in each transformer will cancel each other out.

In a manner corresponding to the first embodiment of the invention, the mutual inductance of the transformers functions to preserve the current distribution during the interruption process.

Once all branches B1, B2, B3 have commutated their respective currents to their respective capacitors $\mathbf{3}_1$, $\mathbf{3}_2$, $\mathbf{3}_3$ or to their respective non-linear resistors $\mathbf{5}_1$, $\mathbf{5}_2$, $\mathbf{5}_3$, the leakage inductance of the transformer(s) will be added to the inductance of the total circuit, since all current derivatives will be in the same direction. However, the leakage inductance, also known as short circuit impedance, of a transformer is very low, several thousands times lower than the magnetizing inductance and can be neglected.

The principles of the invention may be applied in a corresponding manner to any number n of branches B1, B2 . . . , Bn. The DC circuit breaker arrangement $\mathbf{6}^{n-1}$ can thus be designed and adapted for each specific application. However, the above-described DC circuit breaker arrangement 6' having three branches B1, B2, B3 is adequate for most applications that can be foreseen in the near future. It is noted that instead of using e.g. two parallel-connected DC breakers able to handle currents up to 5 kA, a number of more cost-efficient DC circuit breakers able to handle much lower currents, e.g. 500 A, can be used, applying the principles of the invention.

In the above description, a suitable number n of transformers is utilized in order to preserve the current division during an interruption process of the interrupters $\mathbf{2}_1$, $\mathbf{2}_2$, . . . , $\mathbf{2}_n$. However, other means for preserving the current distribution between the different branches could be used instead.

A device comprising only reactors without relying on the above-described mutual inductance could, for example, alternatively be used. However, considerations would have to be made regarding the fact that the very large inductance needed for preserving current distribution during interruption would remain in the circuit even after the interrupters in all branches have succeeded in commutating the current to their respective capacitors or non-linear resistors.

Figure 5:
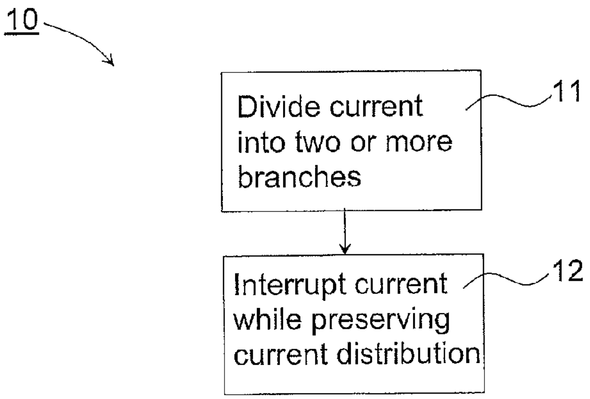
FIG. 5 illustrates steps of a method in accordance with the present invention.

The invention also provides a method 10 for interrupting or commutating a direct current I on a transmission line L or HVDC circuit, as depicted in FIG. 5. The method 10 comprises a first step 11 of dividing the direct current I into two or more branches B1, B2, B3. A second step 12 comprises interrupting the direct current I by actuating DC breakers $\mathbf{1}_1$, $\mathbf{1}_2$, $\mathbf{1}_3$ arranged at each respective branch B1, B2, B3, while preserving, by means of a transformer arrangement, the current division during interruption of the direct current I. The DC breakers $\mathbf{1}_1$, $\mathbf{1}_2$, $\mathbf{1}_3$ are arranged as described earlier, as is the transformer arrangement, i.e. the transformer arrangement is one single-phase two winding transformer T1 if the current is divided into two branches, or three two winding transformers T1, T2, T3 if the current is divided into three branches, and so on, n two-winding transformers T1, T2, Tn for dividing the current into n branches.

In summary, the present invention provides means for permitting the interruption of direct currents above 5 kA, most advantageously at 10 kA or even higher by combining conventional DC breakers having interrupters able to handle up to about 5 kA. The invention is thus advantageous for applications in which the current exceeds 5 kA, be it in nominal current or during overload conditions. By dividing the current into two or more branches, each one carrying half or less of the direct current I, the steady state current in each interrupter is halved or even better. Further, the current to be interrupted (or to oscillate at) is halved or better. Further yet, an even current distribution is forced in steady state and transiently in an innovative manner.

What is claimed is:

1. A DC circuit breaker arrangement for interrupting a direct current on a line, comprising:

n DC circuit breakers connected in parallel, where n>2, which parallel connection of DC circuit breakers is connected in series with said line, said direct current of said line being divided between said n DC circuit breakers, and n reactors, each reactor being connected to one of the DC circuit breakers, for preserving said current division during current interruption, wherein the n reactors as a whole are a plurality of connected transformers and are entirely between two ends of said line, and wherein said line is a high voltage DC transmission line or a part of an HVDC circuit.

2. The DC circuit breaker arrangement of claim 1, wherein n=3, and the plurality of connected transformers are three (3) transformers that are connected in a zig-zag connection.

3. The DC circuit breaker arrangement of claim 2, wherein each of the n reactors has one coil from one of the three (3) transformers, and one coil from another one of the three (3) transformers.

4. The DC circuit breaker arrangement of claim 3, wherein either a non-polarity terminal of the one coil of the one of the three (3) transformers is directly connected to a non-polarity terminal of the one coil of the another one of the three (3) transformers, or a polarity terminal of the one coil of the one of the three (3) transformers is directly connected to a polarity terminal of the one coil of the another one of the three (3) transformers.

5. A DC circuit breaker arrangement for interrupting a direct current on a line, comprising:

n DC circuit breakers connected in parallel, where n>2, which parallel connection of DC circuit breakers is connected in series with said line, said direct current of said line being divided between said n DC circuit breakers, and n reactors, each reactor being connected to one of the DC circuit breakers, for preserving said current division during current interruption, wherein the n reactors as a whole are a plurality of connected transformers, and wherein said line is a high voltage DC transmission line or a part of an HVDC circuit, wherein each of the n DC circuit breakers comprises an interrupter, a resonant LC branch, and a non-linear resistor connected in parallel with said interrupter.

6. A method for interrupting or commutating a direct current on a line, the method comprising:

dividing said direct current into n branches, where n>2, interrupting said direct current by actuating interrupters arranged at each branch, while preserving, by means of n reactors, each reactor being connected to one of the interrupters, said current division during said current interruption, wherein the n reactors as a whole are a plurality of connected transformers and are entirely between two ends of said line, and wherein said line is a high voltage DC transmission line or a part of an HVDC circuit.

7. The method of claim 6, wherein n=3, and the plurality of connected transformers are three (3) transformers that are connected in a zig-zag connection.

8. The method of claim 7, wherein each of the n reactors has one coil from one of the three (3) transformers, and one coil from another one of the three (3) transformers.

9. The method of claim 8, wherein either a non-polarity terminal of the one coil of the one of the three (3) transformers is directly connected to a non-polarity terminal of the one coil of the another one of the three (3) transformers, or a polarity terminal of the one coil of the one of the three (3) transformers is directly connected to a polarity terminal of the one coil of the another one of the three (3) transformers.

* * * * *